(12) United States Patent
Macchetti et al.

(10) Patent No.: US 11,314,518 B2
(45) Date of Patent: Apr. 26, 2022

(54) VERIFICATION OF INSTRUCTIONS FROM MAIN PROCESSOR TO AUXILIARY PROCESSOR

(71) Applicant: NAGRAVISION SA, Cheseaux-sur-Lausanne (CH)

(72) Inventors: Marco Macchetti, Cheseaux-sur-Lausanne (CH); Nicolas Fischer, Cheseaux-sur-Lausanne (CH); Jerome Perrine, Cheseaux-sur-Lausanne (CH)

(73) Assignee: Nagravision S.A., Cheseaux-sur-Lausanne (CH)

( * ) Notice: Subject to any disclaimer, the term of this patent is extended or adjusted under 35 U.S.C. 154(b) by 55 days.

(21) Appl. No.: 16/322,983

(22) PCT Filed: Aug. 2, 2017

(86) PCT No.: PCT/EP2017/069578
§ 371 (c)(1),
(2) Date: Feb. 4, 2019

(87) PCT Pub. No.: WO2018/024797
PCT Pub. Date: Feb. 8, 2018

(65) Prior Publication Data
US 2019/0187994 A1 Jun. 20, 2019

(30) Foreign Application Priority Data
Aug. 4, 2016 (EP) ..................................... 16182872

(51) Int. Cl.
*G06F 9/38* (2018.01)
*G06F 21/55* (2013.01)
(Continued)

(52) U.S. Cl.
CPC .......... *G06F 9/3877* (2013.01); *G06F 21/554* (2013.01); *G06F 21/72* (2013.01); *G06F 11/28* (2013.01); *G06F 30/327* (2020.01)

(58) Field of Classification Search
CPC ........ G06F 9/3877; G06F 21/50; G06F 21/52; G06F 21/54; G06F 21/72; G06F 21/554;
(Continued)

(56) References Cited

U.S. PATENT DOCUMENTS 7,168,065 B1    1/2007  Naccache et al.
7,934,265 B2 *  4/2011  Bancel .................... G06F 11/28
                                                      713/165
(Continued)

FOREIGN PATENT DOCUMENTS

WO    WO 99 1488 A2    3/1999
WO    WO 99 14881 A2   3/1999

OTHER PUBLICATIONS

David D. Hwang, Patrick Schaumont, Kris Tiri and I. Verbauwhede, "Securing Embedded Systems", Apr. 18, IEEE, pp. 40-49 (Year: 2006).*

*Primary Examiner* — Courtney P Carmichael-Moody
(74) *Attorney, Agent, or Firm* — Hoyng Rokh Monegier BV; David P. Owen

(57) ABSTRACT

A method of monitoring execution in an execution environment of an operation, for example a cryptographic operation, comprising a sequence of instructions, is disclosed. Instructions sent in the sequence from a main processor to one or more auxiliary processors, for example cryptographic processors, to execute the operation are monitored and the sequence of instructions is verified using verification information. The method comprises enabling output from the execution environment of a result of the operation in response to a successful verification of the sequence, or (Continued)

generating a verification failure signal in response to a failed verification of the sequence.

16 Claims, 6 Drawing Sheets

(51) Int. Cl.
*G06F 21/72* (2013.01)
*G06F 30/327* (2020.01)
*G06F 11/28* (2006.01)

(58) Field of Classification Search
CPC ...... G06F 21/64; G06F 11/28; G06F 15/7807;
G06F 21/00; G06F 21/53; G06F 15/7889
See application file for complete search history.

(56) References Cited

U.S. PATENT DOCUMENTS

| | | | | |
|---|---|---|---|---|
| 8,315,382 B2* | 11/2012 | Fischer | ................ | H04N 7/1675 |
| | | | | 380/43 |
| 9,177,153 B1* | 11/2015 | Perrig | ..................... | G06F 21/57 |
| 2006/0059369 A1* | 3/2006 | Fayad | ..................... | G06F 21/79 |
| | | | | 713/189 |
| 2019/0236276 A1* | 8/2019 | Hershman | ............... | G06F 21/57 |
| 2021/0141871 A1* | 5/2021 | Conti | .................. | G06F 9/30076 |

* cited by examiner

VERIFICATION OF INSTRUCTIONS FROM MAIN PROCESSOR TO AUXILIARY PROCESSOR

CROSS REFERENCE TO RELATED APPLICATION

This application is a 35 U.S.C. 371 National Phase Entry Application from PCT/EP2017/069578, filed Aug. 2, 2017, which claims the benefit of European Patent Application No. EP 16182872.8, filed on Aug. 4, 2016, the disclosure of which is incorporated herein in its entirety by reference.

TECHNICAL FIELD

The present disclosure relates to the verification of a sequence of instructions sent from a main processor to one or more auxiliary processors, in particular, although not exclusively one or more cryptographic processors implementing hardware acceleration for cryptographic operations.

BACKGROUND

Secure processing environments can comprise a number of processors, typically a main processor for processing an overall operation and a number of auxiliary processors implementing repeated operations as part of the main operation in hardware to accelerate processing. Typically, the operation may be a cryptographic operation and the auxiliary processors may be cryptographic processors implementing elementary cryptographic operations. Implementing some of the overall operation in hardware improves not only processing speed but also security, since it is more difficult to tamper with hardware rather than software. Benefiting from improved security requires that the hardware implemented operations being instructed by the main processor in full and in the intended sequence. Otherwise, the result of the overall operation could be tampered with. This is particularly pertinent in configurations in which the software code implemented by the main processor is provided from outside the secure environment, for example loaded from a flash or other firmware memory outside the secure processing environment at boot or runtime.

BRIEF DESCRIPTION OF THE DRAWINGS

Specific embodiments are disclosed by way of example and described with reference to the accompanying drawings, in which.

DETAILED DESCRIPTION OF THE DRAWINGS

Figure 1:
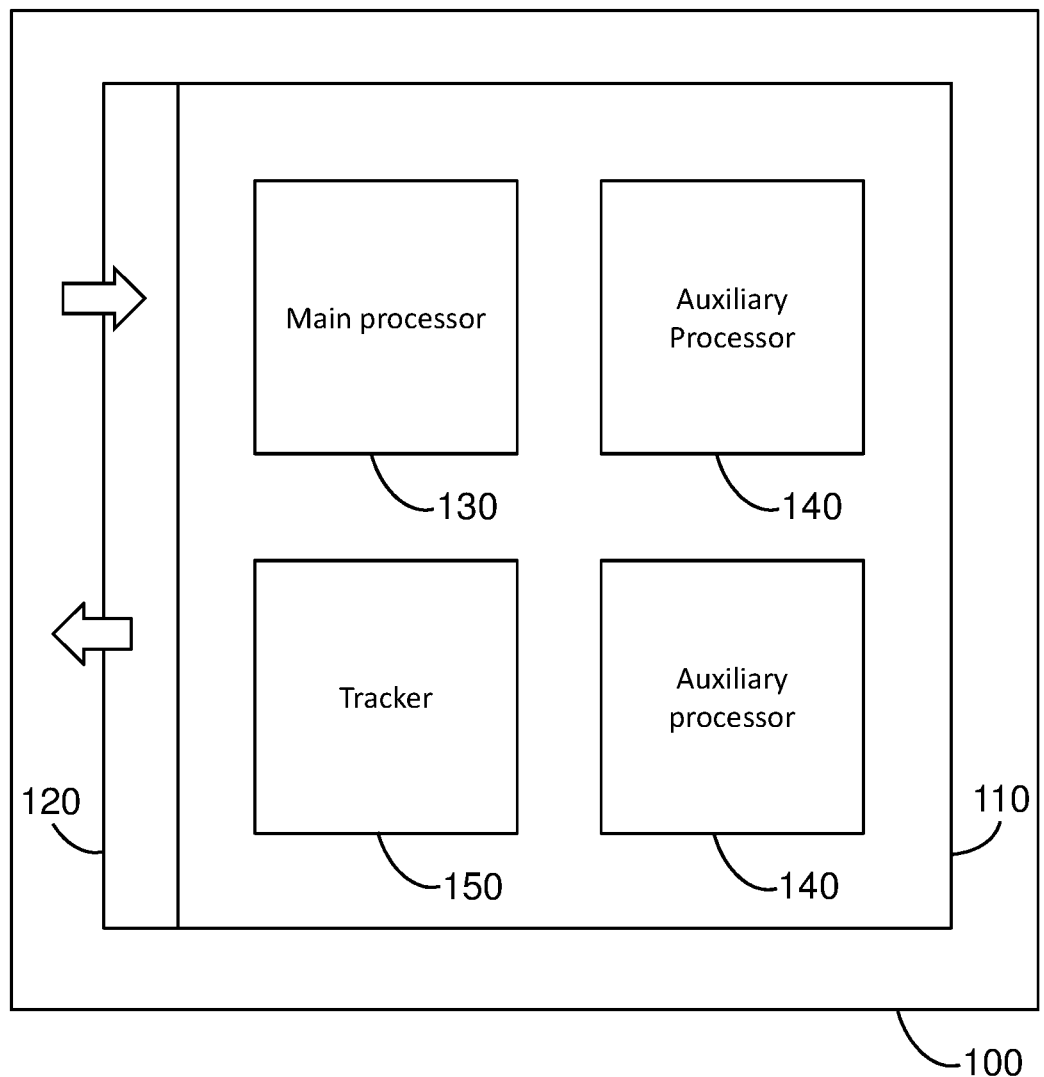
FIG. 1 illustrates a computing device with an isolated execution environment comprising a number of hardware components: a main processor, auxiliary processors and a tracker module.

In overview, in some aspects of the disclosure, there is provided a method of monitoring execution in an execution environment of an operation comprising a sequence of instructions. Instructions sent in the sequence from a main processor to one or more auxiliary processors, for example cryptographic processors, to execute the operation are monitored and the sequence of instructions is verified using verification information. The method comprises at least one, or both, of:

enabling output from the execution environment of a result of the operation in response to a successful verification of the sequence; and generating a verification failure signal in response to a failed verification of the sequence.

Advantageously, by making the ability to output a result conditional on sequence verification being passed, or by generating a failure signal that can be used either by the execution environment or elsewhere in the device to mitigate the effects of a tampering attempt, the security of the operation is increased, even in circumstances where full control over the code used by the main processor to implement the operation cannot be exercised.

In some embodiments, the method comprises updating a state with each instruction in the sequence and verifying the state using the verification information. Verifying the state may comprise comparing a value of the state or a hash or cryptographic one-way function of the value of the state with the verification information. Updating the state may comprises receiving the instructions as they are sent from the main processor to the one or more auxiliary processors and updating the state as the instructions are received, for example adding a hash of the instruction to the state. For added security, the verification information may be provided to the execution environment in encrypted form, preferably using asymmetric encryption. The execution environment may be part of a computing device and the code may be stored in the computing device together with the verification information outside the execution environment. The disclosed sequence verification method facilitates storage of the code outside the secure environment, for example where it can readily be updated as part of a firmware update, while ensuring a measure of integrity by enforcing an intended sequence of instructions to auxiliary processors.

In some embodiments, the method comprises receiving a request to enable output of the result of the operation and verifying the sequence in response to receiving the request. The request may be received from the main processor, for example, and may comprise the verification information. For example, enabling output of the result may comprise enabling access, in particular write-access, by the main processor to an interface memory, accessible from outside the environment, to output a result of the operation. Thus, the method, in effect, may implement a fire wall, around the execution environment, with access being controlled by controlling access to the interface memory. Of course, alternatively or additionally, access, in particular read access, to the interface memory from outside the environment can be controlled. The method may comprise disabling communication between the main processor and the one or more auxiliary processors when output by the processor of the result is enabled. In this way, tampering is made more difficult, since no processing (at least using the auxiliary processors) is possible while the main processor can output data.

In some aspects of the disclosure, there is provided a computing device comprising an isolated environment. The isolated environment comprises a main processor configured to execute an operation, one or more auxiliary processors, an interface, for example an interface buffer memory, and a tracking module. The one or more auxiliary processors, for example cryptographic processors, are configured to receive instructions from the main processor, execute the instructions and return respective responses to the main processor. Executing the operation comprises the main processor sending the instructions in a sequence and receiving respective responses. The interface interfaces between the isolated environment and the remainder of the computing device to receive a result of the operation from the main processor and make it accessible from outside the isolated environment. The tracking module is configured to monitor instructions sent from the main processor to the one or more auxiliary processors and to verify a sequence of the instructions using verification information. In response to the verification, the tracking module does at least one, or both, of:

enable access, for example write-access, to the interface buffer in response to a successful verification of the sequence to enable output of the result; and generate a verification failure signal in response to a failed verification of the sequence.

It will be understood that the above considerations and advantages equally apply to these aspects. The computing device may have one or more additional main and/or auxiliary processors, implementing a Rich Operating System environment and/or a Trusted Execution Environment with shared or respective processor(s) outside the isolated environment and interfacing with the isolated environment via the interface buffer. In some embodiments, the tracking module is configured to implement methods as described above.

Further aspects of the disclosure extend to a net list, optionally stored on one or more computer readable media, comprising a specification of circuit elements and their interconnection to implement an isolated environment as described above and to a computing device comprising means for implementing methods as described above. The disclosed aspects are applicable to many types of computing devices, in particular although not exclusively to set-top boxes or other content receiving devices such as smart tv sets, and find particular application in digital rights management and conditional access applications where the security of cryptographic operations protecting content needs to be ensured.

In yet a further aspect there is provided a method of preparing code for execution by a main processor to implement an operation in a method as described above. The method of preparing code comprises deriving verification information from a sequence of instructions in the code for one or more auxiliary processors and including the verification information with the code, for example as part of an output instruction or as data included with the code, or as a separate item of data distributed together with the code or separately for later combination. The verification information may be included with the code in encrypted form, for example using asymmetric encryption.

Some specific embodiments are now described by way of example to illustrate the disclosure with reference to the accompanying drawings.

Specifically, with reference to FIG. 1, a computing device 100 comprises an isolated execution environment 110, isolated from the remainder of the computing device 100, which can communicate with the remainder of the computing device 100 by means of an interface 120, for example an input output buffer memory providing read and/or write access from inside the isolated environment 110 and read and/or write access from outside the environment 110 to allow the environment 110 to communicate with the remainder of the device 100. The environment 110 comprises a main processor 130 and a plurality of auxiliary processors 140, for example auxiliary cryptographic processors for cryptographic hardware acceleration. The main processor 130 is configured to execute software code implementing an operation, for example a cryptographic operation. The software code includes instructions to be executed by the auxiliary processors 140 and, while executing the software code, the main processor 130 sends instruction to the auxiliary processors 140 and receives intermediate results in the form of responses from the auxiliary processors 140 to produce an overall result of the operation implemented by the software code.

The software code may be stored inside the environment 110, for example after having been loaded into a suitable memory in the environment 110 at boot time of the device 100 or at runtime of the software code. Alternatively, the software code may be stored outside the environment 110 and read by the main processor 130 through the interface 120 or otherwise; or the main processor 130 may receive instructions one by one or in blocks via the interface 120, driven by a processor outside the environment 110.

A tracker module 150 monitors communications between the main processor 130 and the auxiliary processors 140, for example monitoring instructions sent by the main processor 130 to the auxiliary processors 140. For example, the main processor 130 may send instructions to the auxiliary processors 140 over a common data bus (typically isolated from outside the environment 110) and the tracker module 150 may listen to the signals travelling on the data bus. Alternatively, the tracker module may provide, or control, a bus access module of the main processor 130 and the communications may be routed from the main processor 130 to the auxiliary processors 140 via the bus access module.

The tracker module 150 monitors the instructions sent by the main processor 130 to the auxiliary processors 140 and verifies the sequence of instructions, as described in detail below, for example by maintaining an internal state representative for the sequence of instructions and comparing the internal stage to verification information corresponding to the correct sequence. For example, the verification information may be provided to the isolated environment 110 and hence the tracker module 150 together with the software code and may be encrypted, for example using asymmetric encryption, for added security. By comparing the internal state with verification information, the tracker module 150 can determine if the correct sequence of instructions has been executed and take actions such as enabling output of the overall result or raising an alarm contingent on the outcome of the verification.

Figure 2:
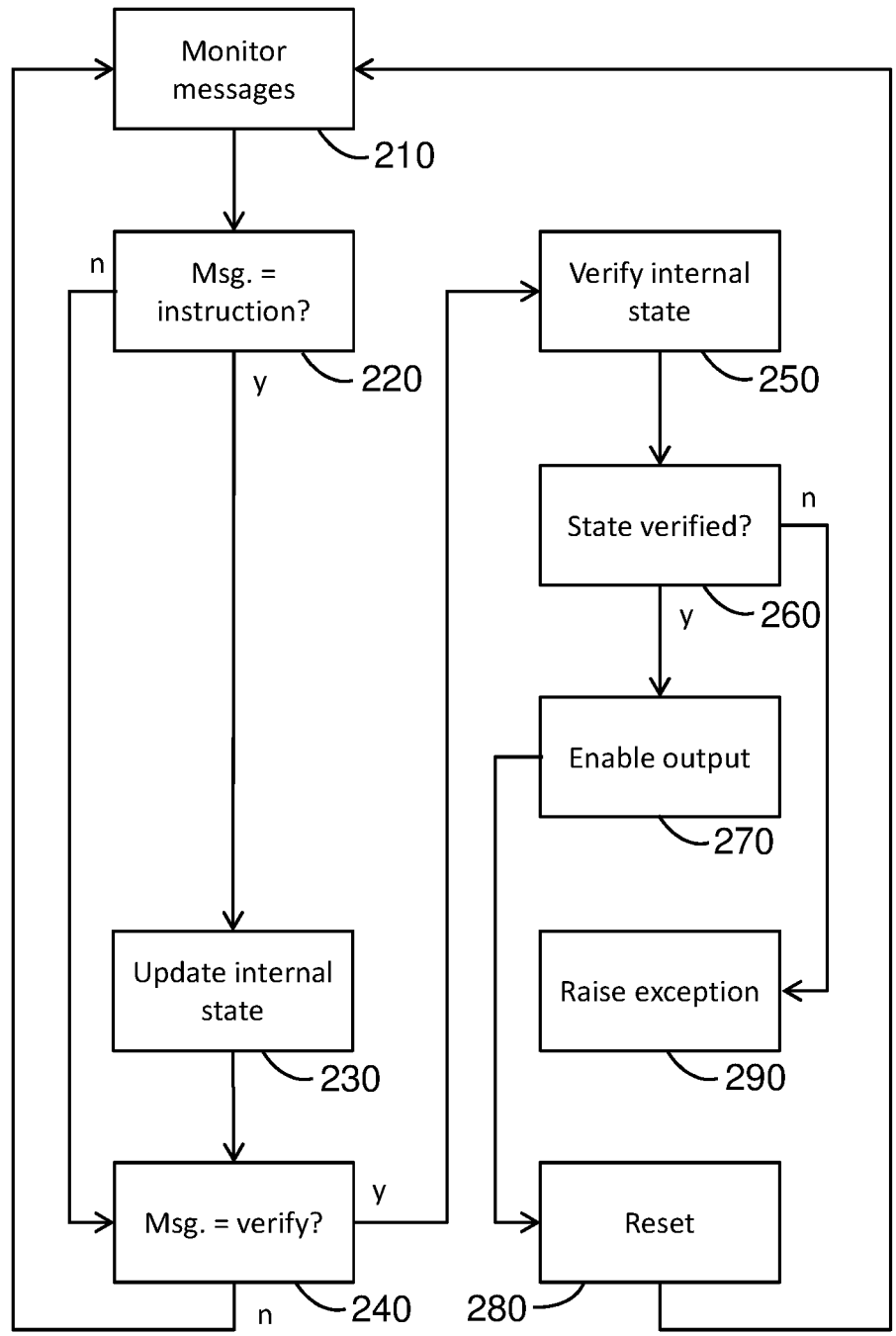
FIG. 2 illustrates a method implemented by the tracker module to track and verify a sequence of instructions sent by the main processor to the auxiliary processors.

In detail, then, turning to FIG. 2, a method of monitoring the sequence is now described. The tracker module 150 monitors messages sent from the main processor 130 to the auxiliary processors 140 at step 210. At step 220, the tracker module 150 checks if the message is an instruction for one of the auxiliary processors 140 to carry out the instruction and return a result and, if so, updates an internal state at step 230. The state may be updated by a calculation based on the current state and the current instruction, or a digest, hash or cryptographic one-way function of the current instruction. An example of a suitable one-way function is any function of the SHA family. The calculation may be adding the value of the instruction or digest/hash/cryptographic one-way function to the state (addition), to concatenate the value of the instruction or digest/hash/cryptographic one-way function to the state, etc.

Subsequently, at step 240, the tracker module 150 checks if the message was a request to the tracker module to verify the state. The message in question may contain both an instruction for the auxiliary processors 140 and a verification request, in which case step 240 follows step 230, or the verification request may be separate from any instructions sent by the main processor 130 to the auxiliary processors 140 and hence follow step 220 directly. For example, the request may be a request from the main processor 130 to the tracker module 150 to enable output of an overall result of the operation implemented by the software code, for example as described in more detail below.

If the message comprises a verification request, the tracker module verifies the internal state at step 250, otherwise the process returns to step 210 and the tracker module continues to monitor messages. Verifying the state at step 250 may comprise comparing the value of the state with an expected value of the state provided by the verification information. For example, the state, or a function of the state, may be compared to the verification information, or a corresponding function of the verification information, as the case may be. To ensure that the verification information is not tampered with, it may have been encrypted by the entity preparing the software code and verification information, as described in more detail below. In this case, the verification information is first decrypted at step 250 or before. For example, the verification information may have been encrypted was a private key of an asymmetric encryption algorithm and the corresponding public key is used at step 250 or before to decrypt the verification information. Verification information may be used to verify the state by checking a match between or identity of the state and the verification information (or a function of the state and/or the verification information), or by any other suitable comparison means.

At step 260, the tracker module checks whether the state has been verified or not. If the state has been verified, output of an overall result of the operation is enabled at step 270 and the tracker module resets at step 280 to continue monitoring messages at step 210. This is particularly applicable to embodiments where the verification request is received with a request to output an overall result of the operation. It will be understood that, when the output of an overall result is enabled, it was previously disabled, for example in response to a previous operation having completed, a timeout, boot-up, etc, or as described below. In other embodiments, for example where a verification request is received with each or an instruction for the auxiliary processors 140, the action on positive verification may differ, for example enable the processor in question to process the instruction or return a result to the main processor 130.

If verification is negative as determined at step 260, an exception is raised at step 290, generating a verification failure signal that can be used as an alarm signal elsewhere in the device, for example to cause a shutdown of the device or alert a third party. The verification failure signal may, alternatively or additionally, be used to prevent further processing in the isolated environment 110, for example by erasing data held in dynamic memory in the isolated environment 110, blocking the interface 120, etc. While some embodiments include both steps 270 and 290, other embodiments only implement one of those steps.

Figure 3:
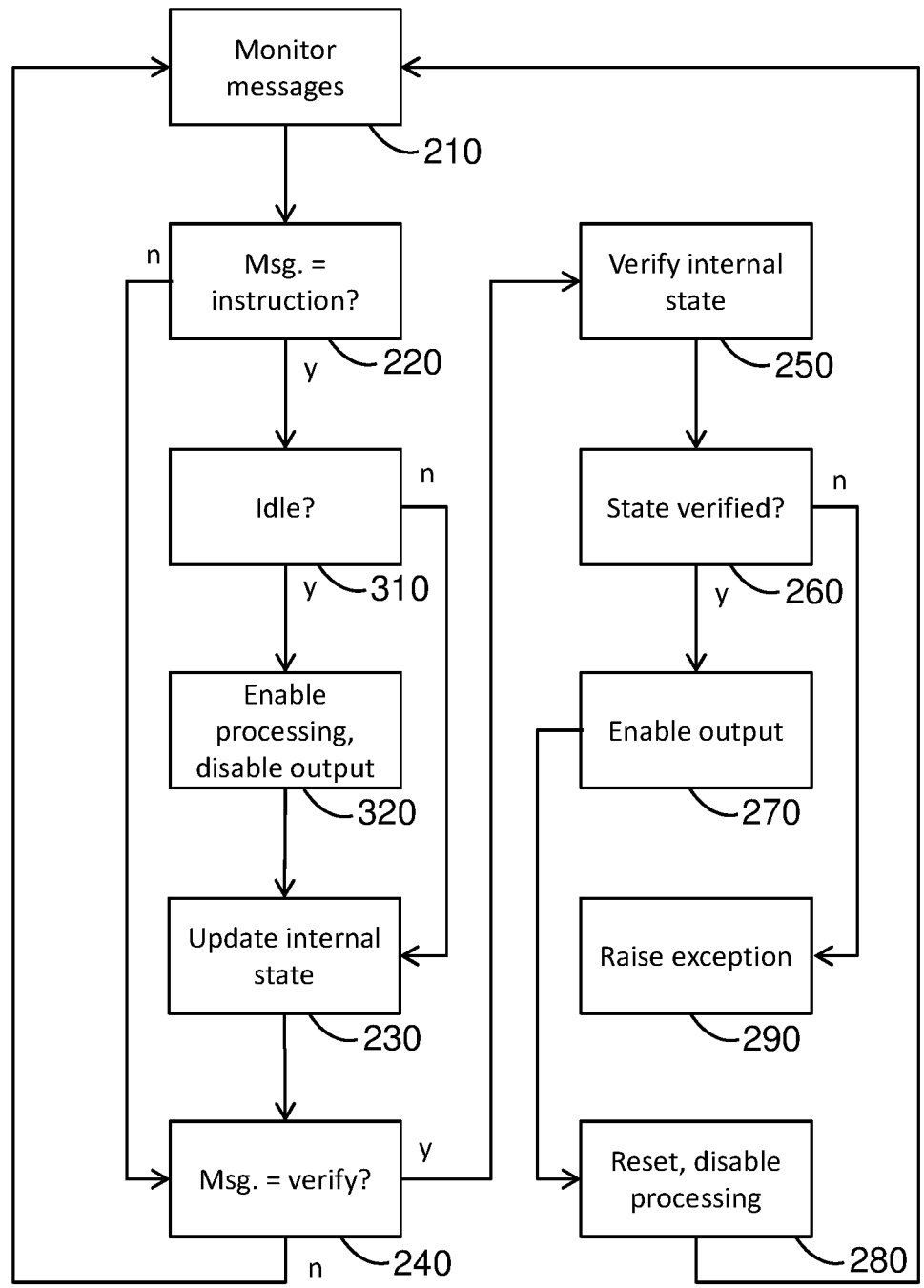
FIG. 3 illustrates a variant of the method illustrated in FIG. 2.

With reference to FIG. 3, in some embodiments, additional steps are added to the process to further increase security. Like steps in FIG. 3 are given and the same reference numerals as in FIG. 2 and have been described above. A step 310 is inserted after step 220 referred to above, checking whether the tracker module 150 currently is in an idle mode, for example as described in more detail below. In the idle mode of the tracker module, access by the main processor to the interface 120 and hence output of an overall result of the operation is not disabled and the main processor 130 can freely access interface 120 to read and write data. However, in the idle mode of the tracker module 140, access of the main processor 130 to the auxiliary processors 140 for execution of instructions is disabled, thus ensuring that no cryptographic operations can be executed and output without suitable verification.

If at step 310 it is determined that the tracker module 150 is idle when a message comprising an instruction is received (see step 220), a different mode is entered at step 320 enabling processing of instructions from the main processor 130 by the auxiliary processors 140 and disabling output of the overall result, for example by disabling write access by the main processor, directly or indirectly, to the interface 120, at step 320. If the determination at step 310 is that the tracker module is not idle, that is code execution is already tracked/a sequence of instructions monitored, the process proceeds as above at step 230. Additionally, in addition to the added steps 310 and 320, step 280, resetting the tracker module 150, is modified to return the tracker module 150 to the idle mode and disabled processing once output has been enabled at step 270. In this way one of processing and outputting is disabled at any one time and only the correct sequence of instructions during processing enables subsequent output of a result.

Figure 4:
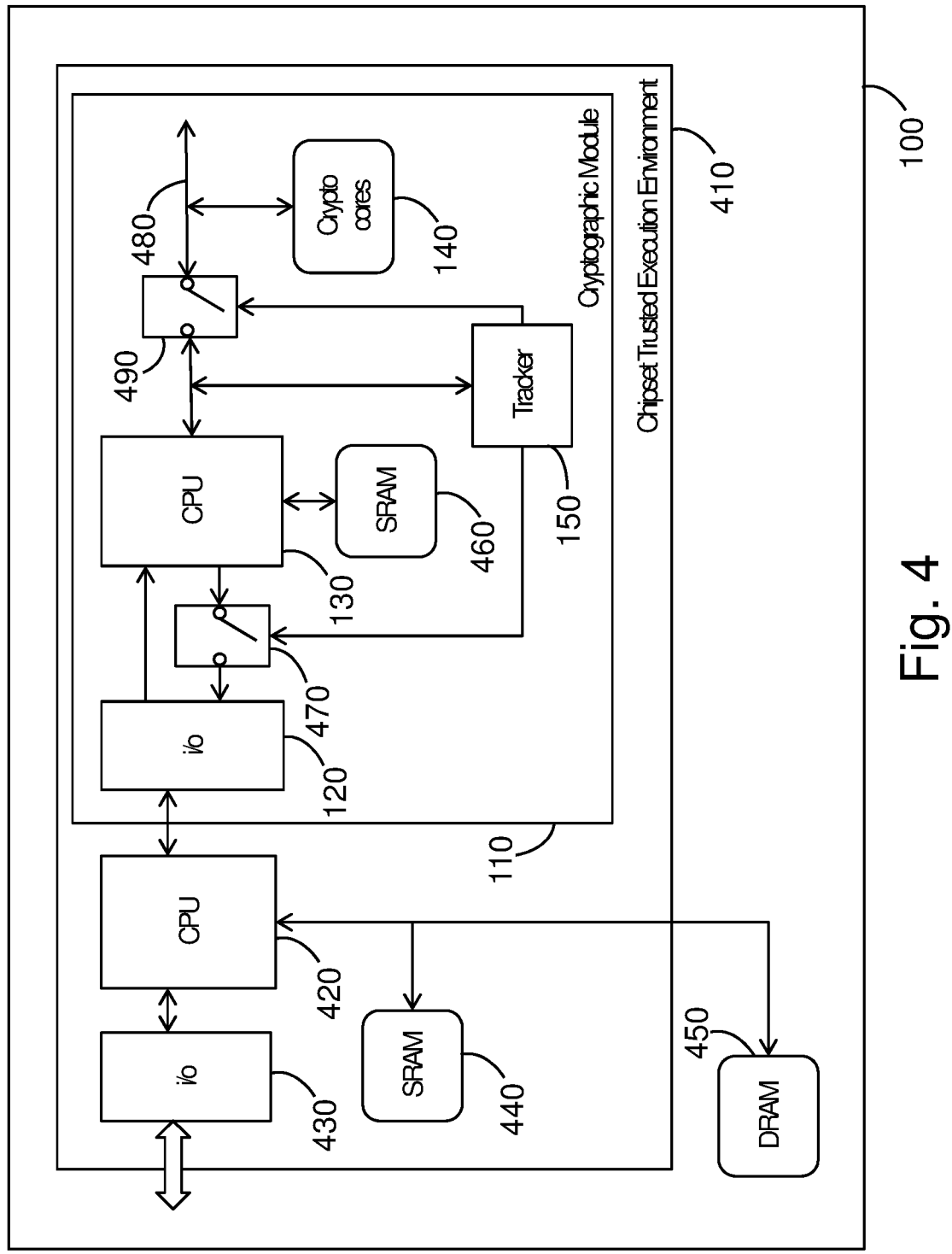
FIG. 4 illustrates a detailed implementation of a computing device as illustrated in FIG. 1.

With reference to FIG. 4, in some embodiments, the computing device 100 comprises a trusted execution environment (TEE) chipset 410 comprising a TEE main processor 420, an input/output interface 430 and a static random access memory (SRAM) 440. The TEE main processor 130 is in communication with the SRAM 440 and a dynamic random access memory (DRAM) 450 outside the chipset 410 in the computing device 100. The remainder of the computing device 100 outside the chipset 410 is in communication with the chipset 410 through the interface 430, for example interfacing a rich operating system of the computing device 100 with the TEE of the chipset 410. The isolated environment 110 is provided as part of the chipset 410 to implement a cryptographic module for cryptographic operations. The TEE main processor 420 can access the isolated execution environment 110 by writing to and reading from the interface 120, in particular to request execution of cryptographic operations and obtain a corresponding result from the isolated execution environment 110.

A specific embodiment of the isolated execution environment 110, whether implemented together with TEE chipset 410 or otherwise as part of the computing device 100 is now described, The main processor 130 is in communication with a SRAM 460 to provide working memory for the isolated execution environment 110. It will be appreciated that any other form of working memory, in combination with non-volatile storage, inside or outside the isolated execution environment 110, may be used instead or additionally. The tracker module 150 controls an output switch 470 in a write connection between the main processor 130 and the interface 120, so that the tracker 150 can control write access by the main processor 130 to the interface 120. It will be appreciated that the switch 470 may take many forms and may implement a logical switch function without being a physical switch, for example shorting the write connection to ground, low or high voltage to disable write access to the interface 120. In some embodiments, the switch 470 may be implemented as a suitably connected transistor. In some embodiments, the main processor 130 may retain read access to the interface 120 irrespective of whether write access is enabled or not.

The one or more auxiliary processors 140, for example one or more cryptographic processors or crypto cores, are in some embodiments in communication with the main processor 130 over a data bus 480 and the tracker module 150 is coupled to a data bus switch 490, which may be configured similarly to the output switch 470. The data bus switch 490 is configured to, under the control of the tracker module 150, control access by the main processor 130 to the auxiliary processors 140, enabling or disabling access as required. In other embodiments, the tracker module controls access in other ways, for example by providing a bus driver enabling the main processor to communicate over the data bus 480 and/or by setting memory locations of the interface 120 to a fixed value of zero or one using suitably connected AND and/or NOT gates.

Figure 5:
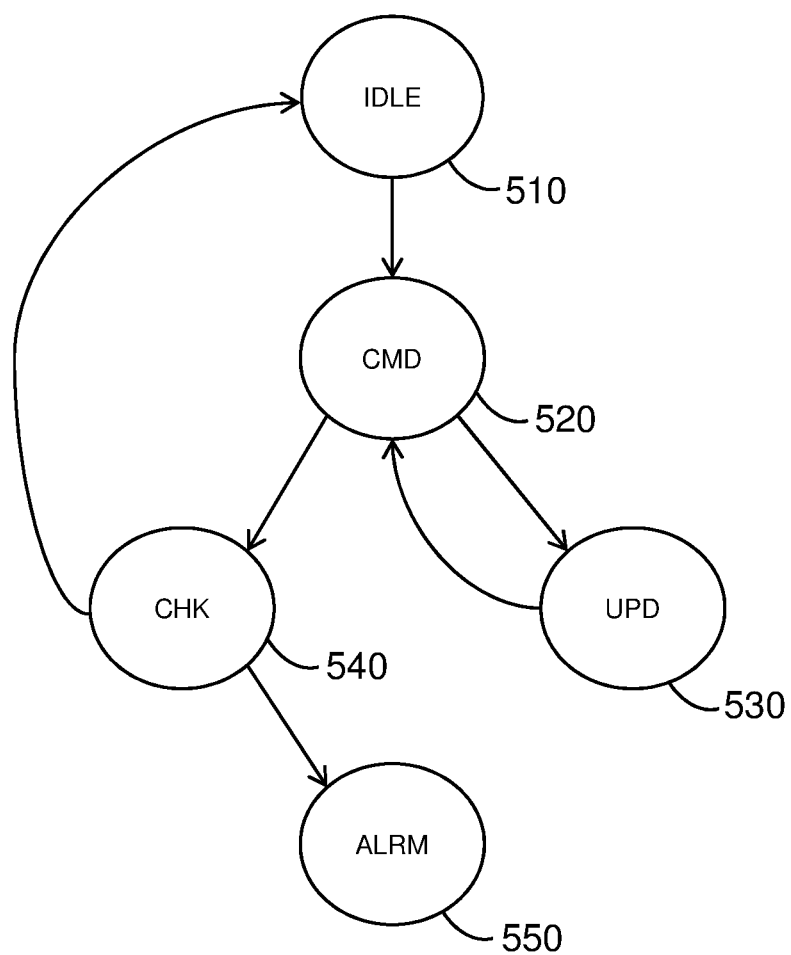
FIG. 5 illustrates a finite state machine specifying modes of the tracker module, for example of the implementation illustrated in FIG. 4.

With reference to FIG. 5, in some embodiments, the tracker module 150 implements a plurality of operational modes, as follows:
- Idle (IDLE, 510): monitor messages on the data bus 480; write access by main processor 130 to the interface 120 enabled; access by main processor 130 to the auxiliary processors 140 disabled; reset state.
- Command (CMD, 520): monitor messages on the data bus 480; write access by main processor 130 to the interface 120 disabled; access by main processor 130 to the auxiliary processors 140 enabled.
- Update (UPD, 530): update the state using a calculation of the current state and current instruction to the one or more auxiliary processors, as described above.
- Check (CHK, 540): Check the state using verification information as described above.
- Alarm (ALRM, 550): Generate a verification failure signal, as described above; write access by main processor 130 to the interface 120 disabled; access by main processor 130 to the auxiliary processors 140 disabled.

The tracker module 150 is initially in IDLE and transitions to CMD if an instruction from the main processor 130 to an auxiliary processor 140 is detected on the data bus 280. The tracker module 150 transitions immediately from CMD to UPD to update the state and transitions back to CMD on completion of the update to monitor for further instructions. Detection of each further instruction causes the tracker module 150 to transition to CMD again. The tracker module 150 transitions from CMD to CHK in response to receiving verification information (for example together with an output request), for example over the data bus 280, and verifies the state using the verification information. If verification is passed, the tracker module transitions to IDLE, enabling output of a result by the main processor 130 and awaiting further instructions being sent to the auxiliary processors 140. If verification fails, the tracker module transitions to ALRM and generates a verification failure signal, as described above, for example also disabling communications by the main processor 130 with both the interface 120 and the auxiliary processors 140. For example, the tracker module 150 may remain in ALRM, once ALRM is entered, until the tracker module is reset and/or the device 100 re-booted.

In some embodiments, the isolated execution environment 110 is implement in silicon, for example as part of a TEE chipset as illustrated in FIG. 4. The circuit elements, and their interconnections, implementing the various components of the isolated execution environment 110 (either in isolation or together with all of those for the chipset) are in some embodiments encoded in a net list, which may be stored on one or more computer readable media and be provided to a chip manufacturer to implement the isolated environment 110 in silicon/integrate it with other areas of the chipset. The chipset may be part of an application specific integrated circuit (ASIC) integrated as one of a number of integrated circuits in the device 100, and may be part of a system on chip or network on chip, etc.

Figure 6:
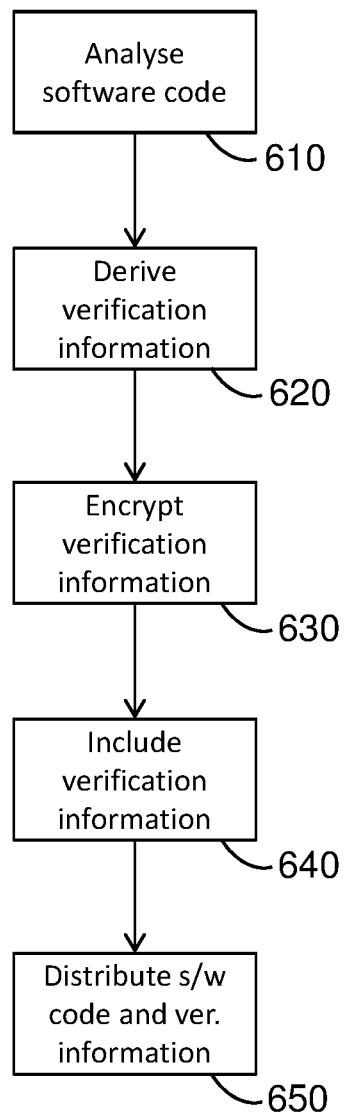
FIG. 6 illustrates a method of preparing verification information for software code, for use by the tracker module.

With reference to FIG. 6, a method of preparing software code for execution by a main processor enabling sequence verification as described above comprises a step 610 of analysing the code to identify a sequence of instructions for auxiliary processors and a step 620 of deriving a verification information in the form of a predicted state by updating an initial state with the identified instructions one by one in sequence as described above. The predicted state (or a function of it) corresponds to the state in the tracker module 150 when monitoring instructions in the sequence as provided in the code. The verification information may be encrypted, for example using asymmetric encryption, at an optional step 630 and included with the software code at step 640. For example, the verification information may be included with an instruction in the code requesting the tracker module 150 to enable output of a result of the operation or in a data section of the code or in separate data files. At step 650, which may be done by a third party, the software code and verification information are distributed to the device 100, for example included in a static memory on manufacture or loaded into a persistent memory, for example flash memory, of the device 100 during or after manufacture, for example as part of a firmware update, for example an over the air software update in the case of set top box.

If the verification information is encrypted, a decryption key, for example a public key if encryption is asymmetric, is distributed separately from the software code. The decryption key may, for example, be hard-coded in a net list of the isolated execution environment 110, or may be installed therein at manufacture or on first boot. The decryption key may, in some embodiments, be stored so that it can be updated from time to time.

Having read the above description of some specific embodiments, it will be understood that the following embodiments are disclosed and may be claimed:

1. A method of monitoring execution in an execution environment of an operation comprising a sequence of instructions, the method comprising:
   monitoring instructions sent in the sequence from a main processor to one or more auxiliary processors to execute the operation;
   verifying the sequence of instructions using verification information; and
   at least one of:
   enabling output from the execution environment of a result of the operation in response to a successful verification of the sequence; and
   generating a verification failure signal in response to a failed verification of the sequence.

For example, the execution environment may be isolated from a device in which it is implemented and communicate with the remainder of the device over one or more dedicated interfaces. In this way, in particular if the monitoring is implemented in hardware, the integrity of the computation in the isolated execution environment can be ensured with increased security.

2. A method according to item 1, comprising updating a state with each instruction in the sequence, wherein verifying the sequence comprises verifying the state using the verification information.

Updating the state may comprise adding the instruction or a hash of the instruction to the state or combining the state with the instruction or hash of the instruction with any other suitable operation in addition or instead of addition. Verifying the state using verification information may comprise comparing a value of the state to the value of the verification information, for example by comparing the values of respective functions of the state and verification information. One or both of the functions may be multiplication with unity and the functions may be the same or different, as long as the respective values can be compared. Examples of possible functions are hash functions or cryptographic one-way functions. Other ways of defining and updating the state are of course equally possible, for example concatenating each instruction, or a hash of each instruction, to any previous instructions or hash, giving a state the size of which will vary with the length of the sequence. More generally, updating the state comprises a calculation using the current state and current instruction, or a hash/digest/function of the current instruction, to calculate the next state.

3. A method according to item 2, wherein verifying the state comprises comparing the state with the verification information.

4. A method according to claim 2 or 3, wherein the verification information comprises a value of an expected state after updating the state with each instruction in the sequence.

5. A method according to claim 3, wherein comparing the state comprises comparing a function of the state with the verification information and the verification information comprises a value of the function of an expected state after updating the state with each instruction in the sequence.

6. A method according to any one of claims 2 to 5, wherein updating the state comprises receiving the instructions as they are sent from the main processor to the one or more auxiliary processors and updating the state as the instructions are received.

Updating the state may comprises storing the instructions and updating and verifying the state later on, for example when an output request is received, or verifying the sequence may comprise comparing the sequence of instructions or a hash or cryptographic one-way function of it against the verification information. The sequence may be the total sequence of instructions required to implement the operation or only a subset. For example, verification may occur after each instruction is received for the sequence up to that instruction (with corresponding verification information). In this case, positive verification may not result in enabling output until the last instruction of the sequence has been verified.

7. A method according to any preceding item, comprising decrypting encrypted verification information to obtain the verification information.

8. A method according to item 6, wherein the encrypted verification information has been encrypted using a private key and decrypting the encrypted information comprises using a corresponding public key.

9. A method according to any preceding item, comprising receiving a request to enable output of the result of the operation and verifying the sequence in response to receiving the request.

10. A method according to item 9, wherein the request is received from the main processor.

11. A method according item 9 or 10, wherein the request comprises the verification information.

12. A method according to any preceding item, wherein enabling output of the result comprises enabling access by the main processor to access an interface memory accessible from outside the environment to output a result of the operation.

It will be understood that, in embodiments enabling output/access in response to a successful verification, prior to enabling output/access, output/access is disabled. In particular, access may be enabled/disabled in a number of ways, for example by connecting an access control signal to each bit of the interface memory, or to each output bit of the interface memory if the interface is bi-directional, with respective AND gates and setting the access control signal to ZERO to disable access and to ONE to enable access. It will be noted that the main processor can attempt to write to the interface in the disabled state but that this will not affect the value of the bits of the interface memory. Access can of course be enabled or disabled in number of other ways, for example by actuating a switch to open or close a connection between the main processor and the interface memory. It will be understood that output may also be disabled by disabling access to the interface memory from outside the environment.

The verification failure signal may trigger an alarm alerting a device in which the method is implemented or a user of a device to the verification failure. Additionally or instead, the verification failure signal may disable certain functionality, for example disable output of the result in embodiments where output is not disable during processing, delete the result and/or any intermediate results from memory, prevent processing of instructions by the auxiliary processors, etc.

13. A method according to any preceding item, the method comprising disabling communication between the main processor and the one or more auxiliary processors when output by the processor of the result is enabled.

It will be understood that prior to disabling communication, communication is enabled. Communication may be enabled/disabled in a number of ways. For example, the main processor may be connected to the auxiliary processors via a switch that is actuated to open and close a connection between the main processor and the one or more auxiliary processors, for example a switch on a line connecting the main processor to a bus to which the one or more auxiliary processors are connected, a gate keeping the bus at a fixed value, etc. Alternatively, an access control signal may be connected to auxiliary processor to interrupt the input and/or output from the auxiliary processors, for example with respective AND gates and setting the access control signal to ZERO to disable access and to ONE to enable access. It will be noted that the main processor can attempt to read or write to the auxiliary processors in the disabled state but will not receive any response, so that communication is in effect disabled.

14. A method according to any preceding item, the method comprising both of
enabling output from the execution environment of a result of the operation in response to a successful verification of the sequence; and generating a verification failure signal in response to a failed verification of the sequence.

15. A method according to any preceding item, wherein the verification information is stored together with code for execution by the main processor to execute the operation.

Of course, the verification information is stored together with the code in clear or encrypted form, as the case may be.

16. A method according to any preceding item, wherein the execution environment is part of a computing device and the code is stored in the computing device together with the verification information outside the execution environment.

17. A computing device comprising an isolated environment, the isolated environment comprising:
a main processor configured to execute an operation;
one or more auxiliary processors configured to receive instructions from the main processor, execute the instructions and return respective responses to the main processor, wherein executing the operation comprises the main processor sending the instructions and receiving the respective responses;
an interface interfacing between the isolated environment and the remainder of the computing device to receive a result of the operation from the main processor and make it accessible from outside the isolated environment; and
a tracking module configured to:
monitor instructions sent from the main processor to the one or more auxiliary processors;
verify a sequence of the instructions using verification information; and
at least one of:
enable access to the interface buffer in response to a successful verification of the sequence to enable output of the result.
generate a verification failure signal in response to a failed verification of the sequence.

It will be understood that the above considerations regarding enabling access, verification signals, state updates, etc, equally apply to the device embodiments.

Further, it will be understood that, of course, the computing device may have one or more additional main and/or auxiliary processors, implementing a Rich Operating System environment and/or a Trusted Execution Environment with shared or respective processor(s) outside the isolated environment and interfacing with the isolated environment via the interface. The interface may comprise an interface memory or buffer, access to which is controlled by the tracker module, for example as described above.

18. A device according to item 17, wherein the tracking module is configured to implement a method according to any one of items 2 to 16.

19. A device according to any one of items 15 to 18, wherein the computing device comprises a code memory for storing, together with the verification information, code for execution by the main processor to implement the operation, wherein the code memory is in outside the isolated environment.

20. A net list, optionally stored on one or more computer readable media, the net list comprising a specification of circuit elements and their interconnection of an isolated environment in accordance with any one of items 17 to 19.

21. A computing device comprising means for implementing a method as claimed in any one of items 1 to 16.

22. A method of preparing code for execution by a main processor to implement an operation in a method as claimed in any one of claims 1 to 16, the method comprising deriving verification information from a sequence of instructions for one or more auxiliary processors in the code and including the verification information with the code.

23. A method according to item 22, wherein the verification information is included with the code in encrypted form.

Embodiments of a computing device have been described above. The computing device, for example a set-top box or other media consumption device, may be connected (e.g., networked) to other machines in a Local Area Network (LAN), an intranet, an extranet, or the Internet. The computing device may operate in the capacity of a server or a client machine in a client-server network environment, or as a peer machine in a peer-to-peer (or distributed) network environment. The computing device may be a personal computer (PC), a tablet computer, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single computing device is illustrated, the term "computing device" shall also be taken to include any collection of machines (e.g., computers) that individually or jointly execute a set (or multiple sets) of instructions to perform any one or more of the methodologies discussed herein.

In addition to the components illustrated, the computing device may have one or more processors in addition to those described above, a main memory (e.g., read-only memory (ROM), flash memory, dynamic random access memory (DRAM) such as synchronous DRAM (SDRAM) or Rambus DRAM (RDRAM), etc.), a static memory (e.g., flash memory, static random access memory (SRAM), etc.), and a secondary memory (e.g., a data storage device XX18), which communicate with each other via a bus.

The computing device may further include a network interface device. The computing device also may include a video display unit (e.g., a liquid crystal display (LCD) or a cathode ray tube (CRT)), an alphanumeric input device (e.g., a keyboard or touchscreen), a cursor control device (e.g., a mouse or touchscreen), and an audio device (e.g., a speaker).

The various methods described above may be implemented by a computer program. The computer program may include computer code arranged to instruct a computer to perform the functions of one or more of the various methods described above. The computer program and/or the code for performing such methods may be provided to an apparatus, such as a computer, on one or more computer readable media or, more generally, a computer program product. The computer readable media may be transitory or non-transitory. The one or more computer readable media could be, for example, an electronic, magnetic, optical, electromagnetic, infrared, or semiconductor system, or a propagation medium for data transmission, for example for downloading the code over the Internet. Alternatively, the one or more computer readable media could take the form of one or more physical computer readable media such as semiconductor or solid state memory, magnetic tape, a removable computer diskette, a random access memory (RAM), a read-only memory (ROM), a rigid magnetic disc, and an optical disk, such as a CD-ROM, CD-R/W or DVD.

A "hardware component" is a tangible (e.g., non-transitory) physical component (e.g., a set of one or more processors) capable of performing certain operations and may be configured or arranged in a certain physical manner. A hardware component may include dedicated circuitry or logic that is permanently configured to perform certain operations. A hardware component may be or include a special-purpose processor, such as a field programmable gate array (FPGA) or an ASIC. A hardware component may also include programmable logic or circuitry that is temporarily configured by software to perform certain operations.

Accordingly, the phrase "hardware component" should be understood to encompass a tangible entity that may be physically constructed, permanently configured (e.g., hardwired), or temporarily configured (e.g., programmed) to operate in a certain manner or to perform certain operations described herein.

Unless specifically stated otherwise, as apparent from the following discussion, it is appreciated that throughout the description, discussions utilizing terms such as "receiving", "determining", "comparing", "enabling", "maintaining," "identifying", "calculating", "verifying", "enabling", "preventing" or the like, refer to the actions and processes of a computer processor, system, or similar electronic computing device, that manipulates and transforms data represented as physical (electronic) quantities within registers and memories into other data similarly represented as physical quantities within the memories or registers or other such information storage, transmission or display devices.

It is to be understood that the present disclosure is intended to be illustrative, and not restrictive. Many other implementations will be apparent to those of skill in the art upon reading and understanding the disclosure. Although the present disclosure has been described with reference to specific example implementations, it will be recognized that the disclosure is not limited to the implementations described, but can be practiced with modification and alteration within the spirit and scope of the appended claims. Accordingly, the specification and drawings are to be regarded in an illustrative sense rather than a restrictive sense. The scope of the disclosure should, therefore, be determined with reference to the appended claims, along with the full scope of equivalents to which such claims are entitled.

The invention claimed is:

1. A method of securing execution in an execution environment of an operation comprising a sequence of instructions, the method comprising:
monitoring communications between a main processor and one or more auxiliary processors, the communications comprising instructions sent in the sequence on a data bus from the main processor to the one or more auxiliary processors to execute the operation;
verifying the sequence of instructions on the data bus using verification information; and
in response to a successful verification of the sequence of instructions, enabling one of the auxiliary processors to process an instruction of the sequence of instructions; and
in response to a failed verification of the sequence, generating a verification failure signal.

2. The method according to claim 1, comprising updating a state with each instruction in the sequence, wherein verifying the sequence comprises verifying the state using the verification information.

3. The method according to claim 2, wherein verifying the state comprises comparing the state with the verification information.

4. The method according to claim 2, wherein updating the state comprises receiving the sequence of instructions as it is sent from the main processor to the one or more auxiliary processors and updating the state as the sequence of instructions is received.

5. The method according to claim 1, comprising receiving a request to enable output of a result of the operation and verifying the sequence in response to receiving the request.

6. The method according to claim 5, wherein the request is received from the main processor.

7. The method according claim 5, wherein the request comprises the verification information.

8. The method according to claim 1, wherein the verification information is stored together with code for execution by the main processor to execute the operation.

9. The method according claim 1, wherein enabling one of the auxiliary processors to process an instruction of the sequence of instructions comprises enabling access by the main processor to the one or more auxiliary processors by using a data switch.

10. A method of preparing code for execution by the main processor to implement an operation in a method as claimed in claim 1, the method of preparing code for execution by the main processor comprising deriving the verification information from a sequence of instructions for one or more auxiliary processors in the code and including the verification information with the code.

11. A computing device comprising an isolated environment, the isolated environment comprising:
a main processor configured to execute an operation;
one or more auxiliary processors configured to receive instructions from the main processor, execute the instructions and return respective responses to the main processor, wherein executing the operation comprises the main processor sending the instructions and receiving the respective responses;
an interface interfacing between the isolated environment and a remainder of the computing device to receive a result of the operation from the main processor and make it accessible from outside the isolated environment; and
a tracking module configured to:
monitor communications between the main processor and the one or more auxiliary processors, the communications comprising the instructions sent on a data bus from the main processor to the one or more auxiliary processors;
verify a sequence of the instructions on the data bus using verification information; and
in response to a successful verification of the sequence of the instructions to enable one of the auxiliary processors to process an instruction of the sequence of instructions;
in response to a failed verification of the sequence to generate a verification failure signal.

12. The computing device according to claim 11, wherein the tracking module is configured to implement a method according to claim 2.

13. The computing device according to claim 11, wherein the computing device comprises a code memory for storing, together with the verification information, code for execution by the main processor to implement the operation, wherein the code memory is outside the isolated environment.

14. The computing device according to claim 11, wherein the computing device further comprises at least one data switch and wherein the tracking module controls the at least one data switch to enable or disable access from the main processor to one of the auxiliary processors.

15. The computing device according to claim 11, wherein the computing device further comprises at least one data switch and wherein the tracking module controls the at least one data switch to enable or disable access from the main processor to the interface.

16. A computer-readable non-transitory storage medium comprising a net list, the net list comprising a specification of circuit elements, and their interconnection, of an isolated environment in accordance with claim 11.

\* \* \* \* \*